US010097031B2

(12) United States Patent
Liu et al.

(10) Patent No.: US 10,097,031 B2
(45) Date of Patent: Oct. 9, 2018

(54) CHARGING DEVICE HAVING SMALL LOOP TRANSMISSION COILS FOR WIRELESS CHARGING A TARGET DEVICE

(71) Applicant: Hong Kong Applied Science and Technology Research Institute Company Limited, Hong Kong (CN)

(72) Inventors: Yan Liu, Hong Kong (CN); Jun Chen, Hong Kong (CN)

(73) Assignee: HONG KONG APPLIED SCIENCE AND TECHNOLOGY RESEARCH INSITTUTE COMPANY LIMITED, Shatin (HK)

( * ) Notice: Subject to any disclaimer, the term of this patent is extended or adjusted under 35 U.S.C. 154(b) by 91 days.

(21) Appl. No.: 15/270,681

(22) Filed: Sep. 20, 2016

(65) Prior Publication Data

US 2018/0083475 A1    Mar. 22, 2018

(51) Int. Cl.
*H02J 7/00* (2006.01)
*H02J 7/02* (2016.01)

(52) U.S. Cl.
CPC .................................... *H02J 7/025* (2013.01)

(58) Field of Classification Search
CPC ....................................................... H02J 7/025
(Continued)

(56) References Cited

U.S. PATENT DOCUMENTS 7,826,504 B2   11/2010   Chen et al. ................ 372/43.01
8,482,158 B2    7/2013   Kurs et al. .................... 307/104
(Continued)

FOREIGN PATENT DOCUMENTS

CN   101789638 A   7/2010
CN   103714953 A   4/2014
(Continued)

OTHER PUBLICATIONS

Notification of Transmittal of the International Search Report and the Written Opinion of the International Searching Authority, or the Declaration dated Jun. 19, 2017, issued by the State Intellectual Property Office in corresponding application PCT/CN2016/100139.
(Continued)

*Primary Examiner* — Suchin Parihar
(74) *Attorney, Agent, or Firm* — Stein IP, LLC (57) ABSTRACT

A charging device to wirelessly charge a target device, including: a coil antenna having a first surface facing a first direction at which the target device is placed for charging and a second surface facing an opposite direction from the first direction, generating a first magnetic field; a plurality of pairs of metallic small loop transmission coils arranged to the second surface side of the coil antenna, to generate a second magnetic field in response to the first magnetic field to enhance the first magnetic field, the first and second magnetic fields being directed in the first direction; and wherein a first one of each pair of metallic small loop transmission coils is coupled to a second one of the pair in parallel and a size of the first one of each pair is different from that of the second one of the pair, such that when a distance between the target device and the first surface is changed, one of the pair of metallic small loop transmission coils is enabled to be resonant with the coil antenna.

18 Claims, 11 Drawing Sheets

(58) Field of Classification Search
USPC .......................................................... 320/108
See application file for complete search history.

(56) References Cited

U.S. PATENT DOCUMENTS

| | | | |
|---|---|---|---|
| 8,692,410 B2 | 4/2014 | Schatz et al. ................. | 307/104 |
| 8,786,135 B2 | 7/2014 | Wang et al. .................. | 307/104 |
| 8,901,778 B2 | 12/2014 | Kesler et al. ................. | 307/104 |
| 2013/0321220 A1 | 12/2013 | Toujo ........................... | 343/702 |
| 2015/0180552 A1 | 6/2015 | Konanur et al. | |
| 2016/0172104 A1* | 6/2016 | Mirbozorgi ............ | H02J 17/00 |
| | | | 320/108 |

FOREIGN PATENT DOCUMENTS

| | | |
|---|---|---|
| CN | 103887896 A | 6/2014 |
| CN | 103931078 A | 7/2014 |
| CN | 204835717 U | 12/2015 |

OTHER PUBLICATIONS

Chinese Office Action dated Jun. 28, 2018, issued by the State Intellectual Property Office in corresponding application CN 2016800010922.

\* cited by examiner

RESONANT FREQUENCY OF SMALL LOOP IS 6.78MHz

$$f = \frac{1}{2\pi \sqrt{L_{loop} \, C_{total}}} \quad (1)$$

FIG. 3A $$f = \frac{1}{2\pi * \sqrt{L_{loop} * C_{total}}} \quad (1)$$

$$\left. \begin{array}{l} A = \dfrac{D1 + N*(W+S)}{2} \\[8pt] L = \dfrac{N^2 * A^2}{30*A - 11*D1} \end{array} \right\} \quad (2)$$

FIG. 3B

N IS THE TURNS OF THE SMALL LOOP

CHARGING DEVICE HAVING SMALL LOOP TRANSMISSION COILS FOR WIRELESS CHARGING A TARGET DEVICE

BACKGROUND OF THE INVENTION

1. Field of the Invention

Aspects of the present invention relate to a charging device having small loop transmission coils to wirelessly charge target devices such as mobile telephones and tablets. More particularly, aspects of the present invention relate to a wireless charging device using small loop transmission coils having different sizes and connected in parallel.

2. Description of the Related Art

Recent years have seen tremendous growth in wireless charging applications, and this trend is expected to continue at least into the near future. Wireless charging is a technology where electromagnetic induction is used to transmit power through air, without the use of power cords or conductors. A wireless charging system includes: i) a charger, i.e., a power transmitter unit (PTU) with a primary coil, and ii) a target device to be charged (charged device), i.e., a power receiver unit (PRU) with a secondary coil. Power in the charger is transferred to the target device to be charged through the electromagnetically coupled primary and secondary coils, and the induced current may be further processed and used to charge the battery of the target device. Energy is transmitted through inductive coupling from the charger to the target device, which may use that energy to charge batteries or as direct operational power for the target device.

Wireless charging is commonly divided into two types. One of the wireless charging types is a magnetic induction type and the other is a magnetic resonance type. Both of these types work on near field technology, i.e., the electromagnetic field dominates the region close to both the PTU and the PRU. The magnetic induction type includes two coils which are very close to each other, generally within a range of a few millimeters to a few centimeters. The magnetic resonance type includes two resonant coils, which are generally separated in a range of a few centimeters to a few meters, operating at the same resonant frequency, are strongly coupled, and thus a high charging efficiency is achievable.

Figure 1A:
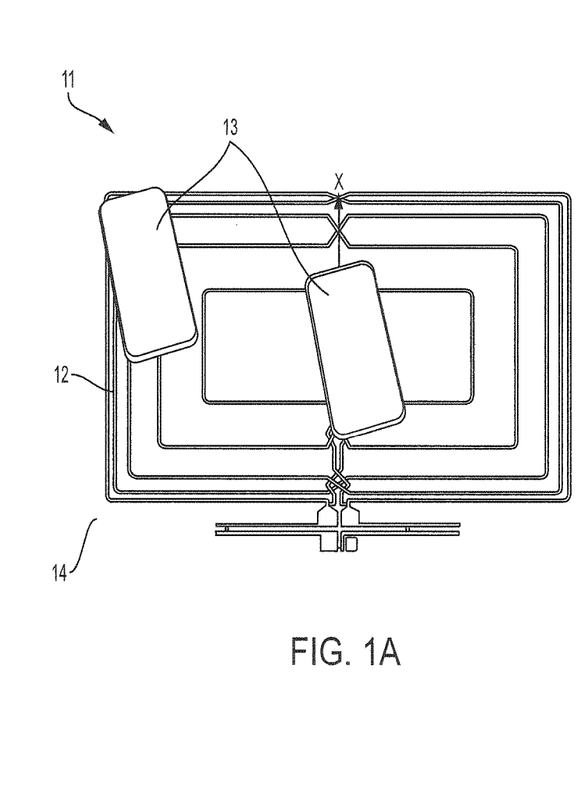
FIG. 1A illustrates a wireless charging device having a coil antenna without a small loop transmission coil design according to the prior art.

As illustrated in FIG. 1A, a wireless charger 11 includes an induction coil antenna 12. The wireless charger 11 senses the presence of a mobile device (target device) 13 for charging on a flat surface of a charger base 14. The induction coil antenna 12 creates an alternating electromagnetic field from within the wireless charger 11, and a second induction coil (not shown) in the mobile device 13 takes power from the alternating electromagnetic field and converts the power back into electric current to charge a battery in the mobile device 13 or to provide direct operational power to the mobile device 13. However, the design of a coil antenna in existing wireless chargers usually suffers from a non-uniformity of the magnetic field issue, especially at an edge region of the induction coil antenna 12. This issue is problematic since an unevenly distributed magnetic field over the charger base surface 14 greatly impacts the charging efficiency, particularly in a negative way.

In addition, too small of an electromagnetic field is generated at the edges of the induction coil antenna 12, thus preventing the mobile device 13 from being able to collect enough power through its second induction coil depending upon the placement of the mobile device 13 on the charger base surface 14.

Figure 1B:
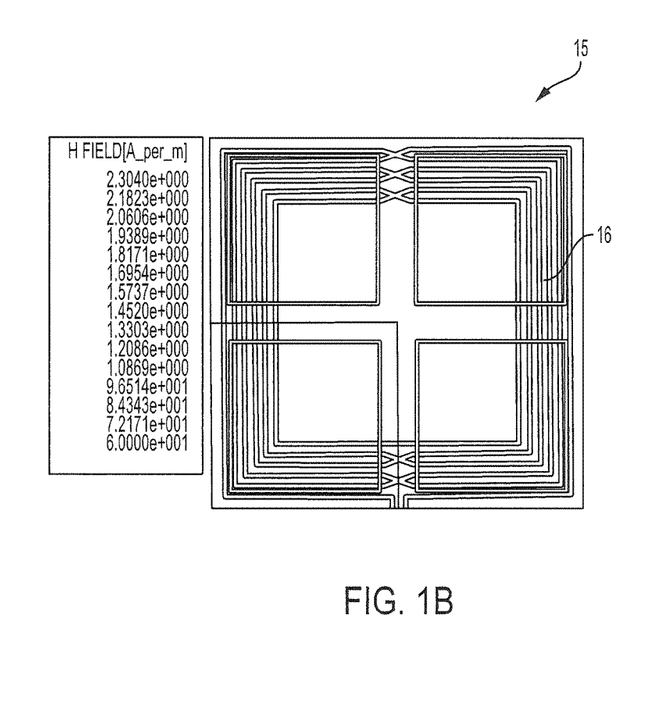
FIG. 1B illustrates a wireless charging device having a coil antenna with a small loop transmission coil design according to the prior art.

To cope with these problems, a design having a small loop coil structure that is placed under a coil antenna has been proposed recently to tackle the unevenly distributed magnetic field problem. The aforementioned design includes multi-small loop transmission coils with common sizes that are placed under a coil antenna. As illustrated in FIG. 1B, a wireless charger 15 includes a coil antenna 16 with a small loop transmission coil 17 structure positioned underneath the coil antenna 16 to provide a higher magnetic field with better uniformity for wireless charging. However, there is a drawback in that the existing small loop coil 17 structure cannot work normally when a phone with a metallic cover and/or case is placed directly on the coil antenna 16. The metallic materials in the phone cover and/or case alter the capacitance of the small loop transmission coil 17 and offsets the resonant frequency. Consequently, the coupling efficiency for wireless charging will then be greatly affected, particularly in a negative way.

SUMMARY OF THE INVENTION

Accordingly, a novel design for a wireless charger with small loop transmission coils under a coil antenna is desirable which can supply an optimal resonant coupling effect according to the location of a charging target mobile device relative to the wireless charger so as to provide increased convenience for users.

According to an aspect of the invention, there is provided a charging device to wirelessly charge a target device, comprising: a coil antenna having a first surface facing a first direction at which the target device is placed for charging and a second surface facing an opposite direction from the first direction, the second surface transmitting radio signals; a plurality of pairs of metallic small loop transmission coils arranged to the second surface side of the coil antenna, to reflect the radio signals from the coil antenna toward the outside surface; and wherein a first one of each pair of metallic small loop transmission coils is coupled to a second one of the pair in parallel and a size of the first one of each pair is different from that of the second one of the pair, such that when a distance between the target device and the first surface is changed, one of the pair of metallic small loop transmission coils is enabled to be resonant with the coil antenna.

According to another aspect of the invention there is provided a method of wirelessly charging a target device, comprising: transmitting radio signals from a second surface of a coil antenna, the coil antenna having a first surface facing a first direction at which the target device is placed for charging and the second surface facing an opposite direction from the first direction; and reflecting the radio signals transmitted from the coil antenna using a plurality of pairs of metallic small loop transmission coils arranged to the second surface side of the coil antenna, toward the outside surface; wherein a first one of each pair of metallic small loop transmission coils is coupled to a second one of the pair in parallel and a size of the first one of each pair is different from that of the second one of the pair, such that when a distance between the target device and the first surface is changed, one of the pair of metallic small loop transmission coils is enabled to be resonant with the coil antenna.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
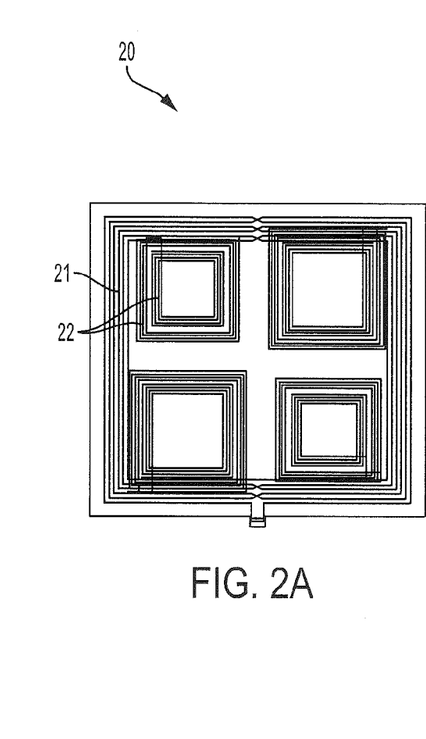
FIGS. 2A-2C illustrate a structure of a wireless charging device including a coil antenna with pairs of small loop transmission coils.
Figure 2B:
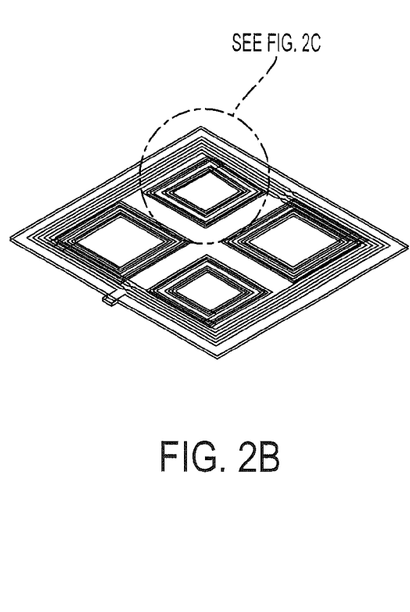
Figure 2C:
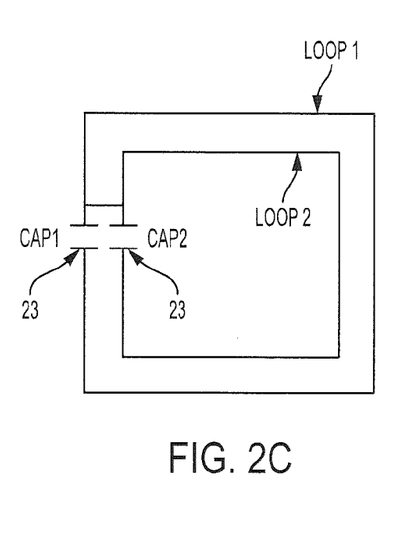
Figures 5A, 5B, 5C:
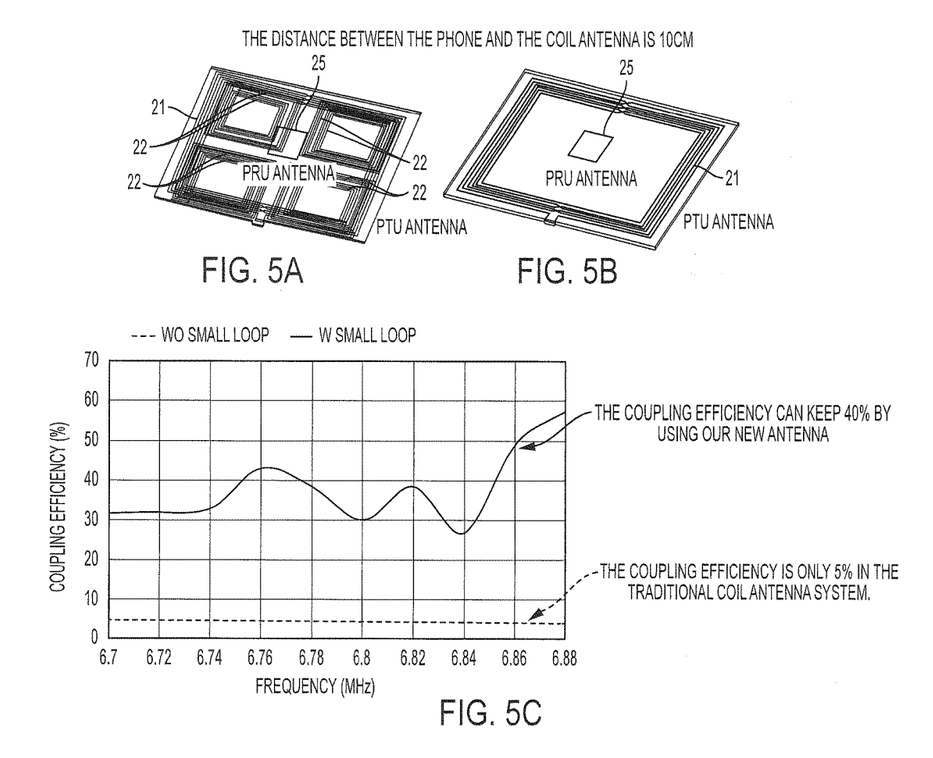
FIGS. 5A and 5B illustrate a comparison between two different design structures, one where the coil antenna has and one without small loop transmission coils placed under the primary coil antenna.
FIG. 5C shows the coupling efficiency for the primary coil antenna with and without the small loop transmission coils.

According to an embodiment of the invention, FIGS. 2A-2C illustrate a wireless charging device 20 with a coil structure including a primary coil antenna 21 with multiple small loop transmission coils 22 of different sizes underneath the primary coil antenna 21, thereby supplying an induced electromagnetic field suitable for a charging target device (not shown) having a secondary coil antenna (see PRU antenna 25 in FIG. 5B). This wireless charging device 20 is based on a magnetic resonance type, where the primary coil antenna 21 and the target device to be charged are generally separated by a distance in a range of a few centimeters to a few meters.

As shown in FIGS. 2A and 2B, the coil antenna 21 includes four pairs of small loop transmission coils 22 with one of each pair connected in parallel with the other one of the pair, and the one of each pair having a different size and/or shape relative to the other one of the same pair. According to aspects of the present invention, the size of the small loop transmission coils 22 refers to an electrical length of the small loop transmission coil 22. Thus, when referring to different sizes of small loop transmission coils 22, reference is being made that the small loop transmission coils 22 have different electrical lengths which can be manifested in numerous ways/parameters. In FIGS. 2A and 2B, one of the pair of small loop transmission coils 22 has a different size from the other one of the same pair. FIG. 2C is an equivalent electric circuit diagram of one of the pairs of small loop transmission coils 22 for the antenna structure as shown in FIG. 2B. As shown in FIG. 2C, capacitors 23 are connected with the small loop transmission coils 22 in series and can be a gap or a component, such as a ceramic capacitor, in order to form a resonant structure.

Here, the primary coil antenna 21 has an outside surface facing the outside of the charging device 20 where the target device is to be placed for charging and an opposite inside surface facing internally into the charging device 20. The small loop transmission coils 22 are metallic loops arranged at the inside surface side of the coil antenna 21, to reflect radio signals that are transmitted from the inside surface of the coil antenna 21 (in the direction of the interior of the charging device 20) toward the outside surface at which the target device is be located/placed for wireless charging.

When the coil antenna 21 is operating, the magnetic field from the coil antenna 21 is coupled into the small loop transmission coils 22, which responds with a first magnetic field. The field form (a second magnetic field) of the small loop transmission coils 22 is added to the magnetic response (first magnetic field) of the coil antenna 21, thus enhancing the overall magnetic field of the wireless charging device 20.

Figure 2D:
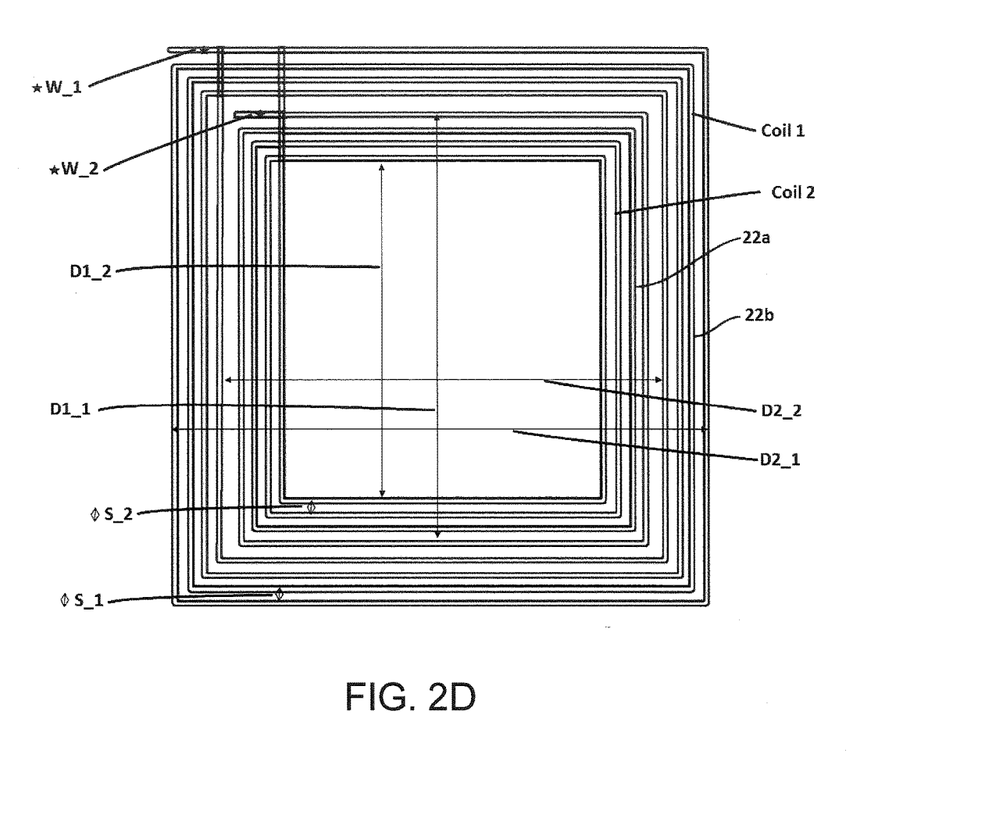
FIG. 2D illustrates a blown up view of one of the pairs of small loop transmission coils, according to an embodiment of the invention.

FIG. 2D shows a blown up view of one of the pairs of small loop transmission coils 22, where one small loop transmission coil 22a of the pair is smaller than the other small loop transmission coil 22b and the two small loop transmission coils 22a, 22b are connected to each other in parallel. It should be noted that the "pair" of small group loop transmission coils 22 is not limited to only two (2) small loop transmission coils, but it is possible that there are 3 or more small loop transmission coils 22 in a "pair" as used in this specification D1-1 and D2-1 are the inner and outer diameters, respectively, of the small loop transmission coil 22a, and D1-2 and D2-2 are the inner and outer diameters, respectively, of the small loop transmission coil 22b.

Figure 3A:
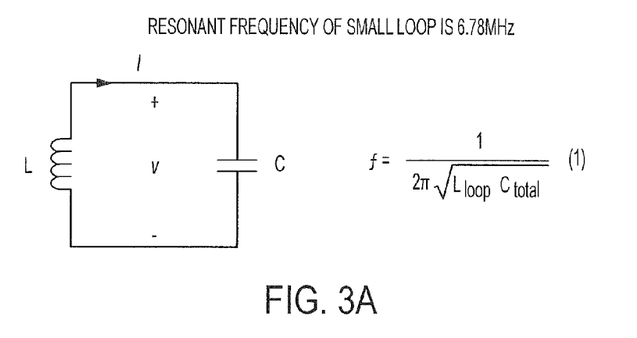
FIGS. 3A-3C illustrate a cross sectional diagram of the wireless charging device and formulae for obtaining resonant frequency and inductance for the coil antenna with small loop transmission coils shown in FIGS. 2A-2D.
Figure 3B:
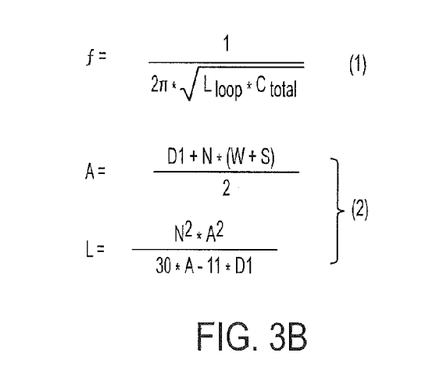
Figure 3C:
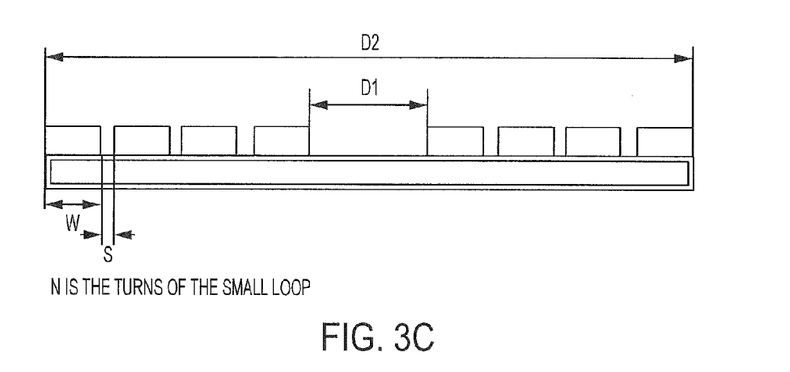

FIG. 3A illustrates the operations of obtaining inductance and capacitance values in order to have optimal coupling efficiency for wireless charging. Referring to FIGS. 3A, 3B and 3C, assuming there are two pairs of small loop transmission coils 22, for each pair of the small loop transmission coils 22, with a number of turns N, turn width W, spacing between turn S, inner diameter D1, outer diameter D2, inductance L and capacitance C, given that f=6.78 MHz, the inductance $L_{loop}$ and capacitance $C_{total}$ can be obtained by formulae (1) and (2). For a more detailed parameter determination, commercial simulation tools such as a high frequency structural simulator (HFSS) can be utilized.

$$f = \frac{1}{2\pi\sqrt{L_{loop}C_{total}}} \quad (1)$$

-continued $$L = (N^2 \times A^2)/(30A - 11D1) \quad (2)$$
$$A = (D1 + N(W + S))/2$$

As shown in FIGS. 3A, 3B and 3C, and formulae (1) and (2) above, the inductance L in a small loop transmission coil 22 can be determined by N, W, S and D1. After capturing the value of the inductance L, the capacitance C in formulae (1) and FIG. 3A can be obtained in order to achieve an optimal coupling effect.

Figure 3D:
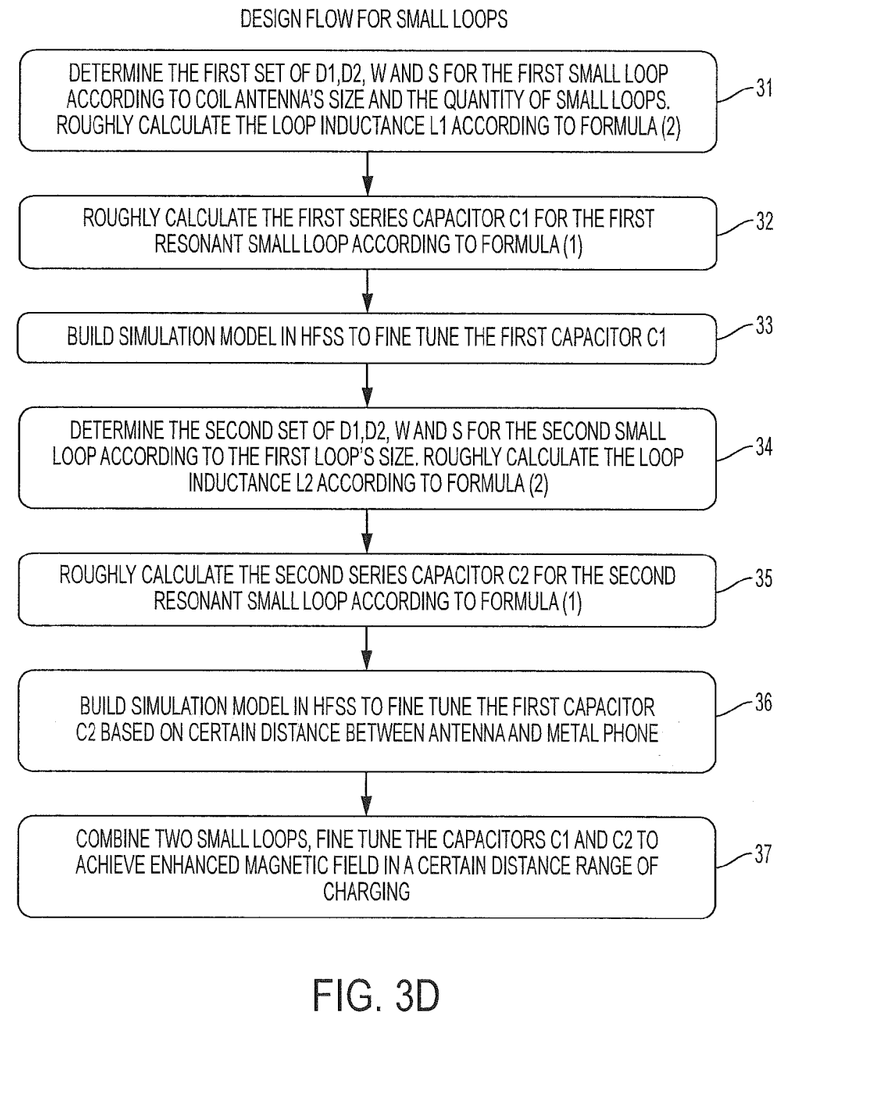
FIG. 3D is a flowchart for obtaining parameters of the charging system shown in FIGS. 2A-2C.

FIG. 3D shows a flowchart for operations in designing the small loop transmission coils 22. At operation 31, determining the value for the first set of feature sizes D1, D2, W and S for a first one of a pair of the small loop transmission coils 22 and according to a size of the primary coil antenna 21 and the quantity of small loop transmission coils 22 is performed. Supplying the D1, N, W and S values to the formula (2) in FIG. 3B, the value of inductance $L_{loop1}$ can be obtained. Further, supplying the $L_{loop1}$ value to the formula (1) in FIG. 3B at operation 32, given that a resonant frequency f of the small loop is 6.78 MHz, a value of series capacitance C1 for the first small loop transmission coil 22 can be obtained. At operation 33, a simulation model in the high frequency structural simulator (HFSS) is utilized in order to fine tune the first capacitance C1.

Similarly, at operation 34, determining the value for the second set of feature sizes D1, D2, W and S for a second one of the pair of small loop transmission coils 22 according to the first loop's size is performed. Supplying the second set D1, N, W and S values to the formula (2) in FIG. 3B, a value of inductance L2 can be obtained. Further, supplying the $L_{loop2}$ value to the formula (1) in FIG. 3A at operation 35, given that the resonant frequency f of the small loop is 6.78 MHz, a value of series capacitance C2 for the second small loop transmission coil 22 can be obtained. At operation 36, a simulation model in the HFSS is utilized to fine tune the second capacitance C2 based on a working distance between the primary coil antenna 21 and the phone with the metallic cover and/or case (the target device, particularly the secondary antenna coil of the target device, the PRU antenna 25 shown in FIG. 5B). The working distance is set according to a customer's/user's requirements. The simulation model in the HFSS can determine the optimal gap size between the first and second ones of the pair of small loop transmission coils 22.

At operation 37, combining the parameters determined from the first and second ones of the pair of small loop transmission coils 22, the capacitance of capacitors C1 and C2 could be fine-tuned in order to an achieve enhanced magnetic field in a certain distance range of wireless charging. If the primary coil antenna 21 and the small loop transmission coils 22 work normally (the magnetic field is not decreased sharply based on different distances between the primary coil antenna 21 and the secondary coil antenna of the target device), then fine-tuning is well accomplished.

Figure 4A:
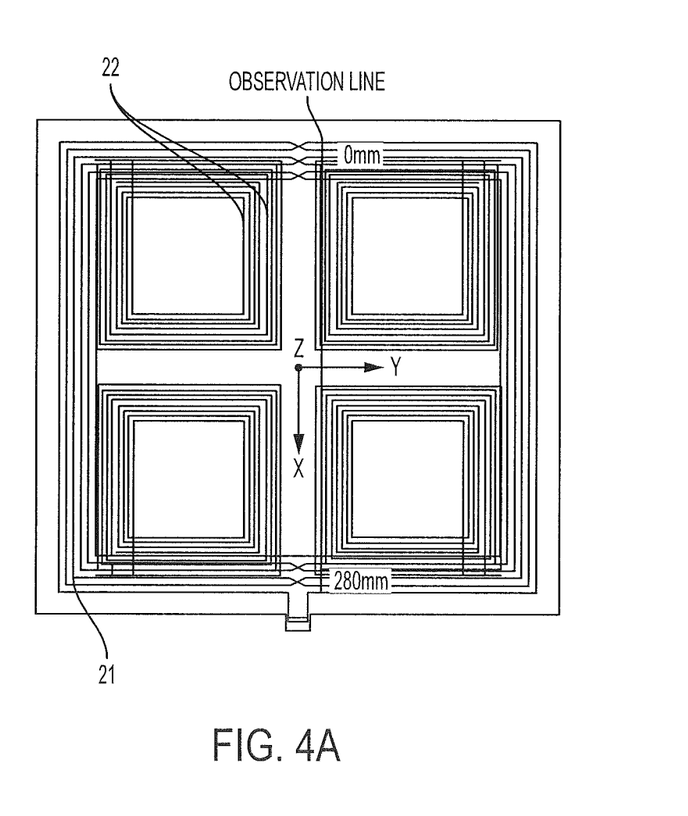
FIGS. 4A-4D illustrate an observation line of the coil antenna and the strength of an H (magnetic) field which is enhanced by using the charging system shown in FIGS. 2A-2C when a phone with a metallic cover and/or case is placed at different heights above the charging system.
Figure 4B:
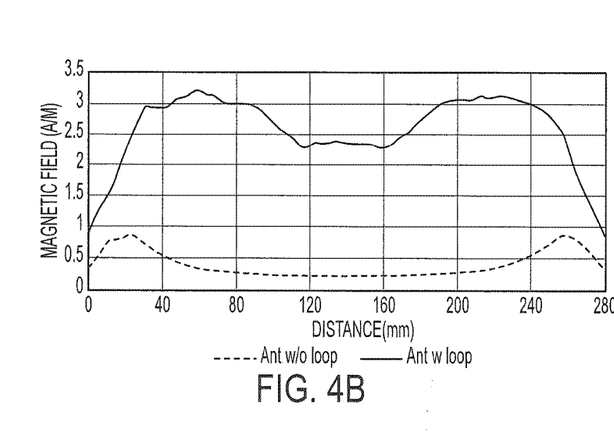
Figure 4C:
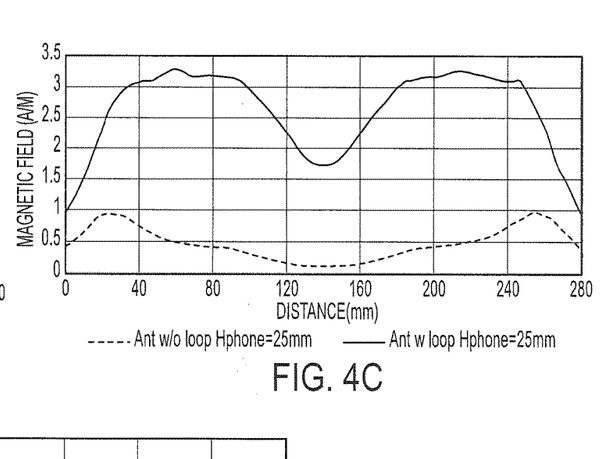
Figure 4D:
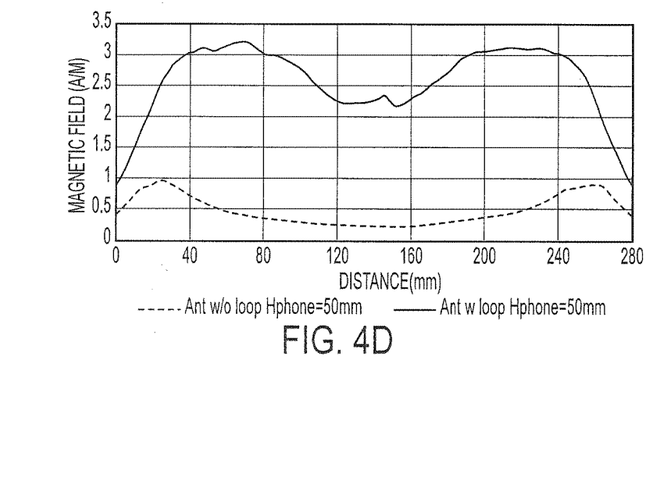

FIG. 4A illustrates an observation line which indicates a position above the primary coil antenna 21. FIGS. 4B-4D illustrate a simulation result that the strength of the magnetic field H is enhanced by using the small loop transmission coils 22 under the primary coil antenna 21 when the phone with the metallic cover or case having the secondary coil antenna (see FIG. 5B) is placed at different heights above the primary coil antenna 21. FIG. 4B illustrates the situation where there is no phone with a metallic cover and/or case above the primary coil antenna 21, and the magnetic strength of the primary coil antenna 21 with small loops 22 is higher than the primary coil antenna 21 without the small loops 22. FIG. 4C illustrates the situation where the distance between the phone with a metallic cover and/or case is 25 mm, and the magnetic strength of the primary coil antenna 21 with small loops 22 is higher than that of the primary coil antenna 21 without small loops 22. FIG. 4D illustrates the situation where the distance between the phone with a metallic cover and/or case is 50 mm, and the magnetic strength of the primary coil antenna 21 with small loops 22 is higher than that of the primary coil antenna 21 without small loops 22.

Further, FIGS. 5A and 5B illustrate a comparison between two different design structures, one where the coil antenna 21 has (FIG. 5A) and one without (FIG. 5B) the pairs of small loop transmission coils 22 placed under the primary coil antenna 21. FIG. 5C shows the coupling efficiency for the primary coil antenna 21 with pairs of small loop transmission coils 22 can be achieved at 40% while the coupling efficiency is 5% only for the primary coil antenna 21 without the pairs of small loop transmission coils 22, given that the distance between the mobile (target) device second coil (PRU antenna) 25 and the primary coil antenna 21 is 10 cm.

Figure 6A:
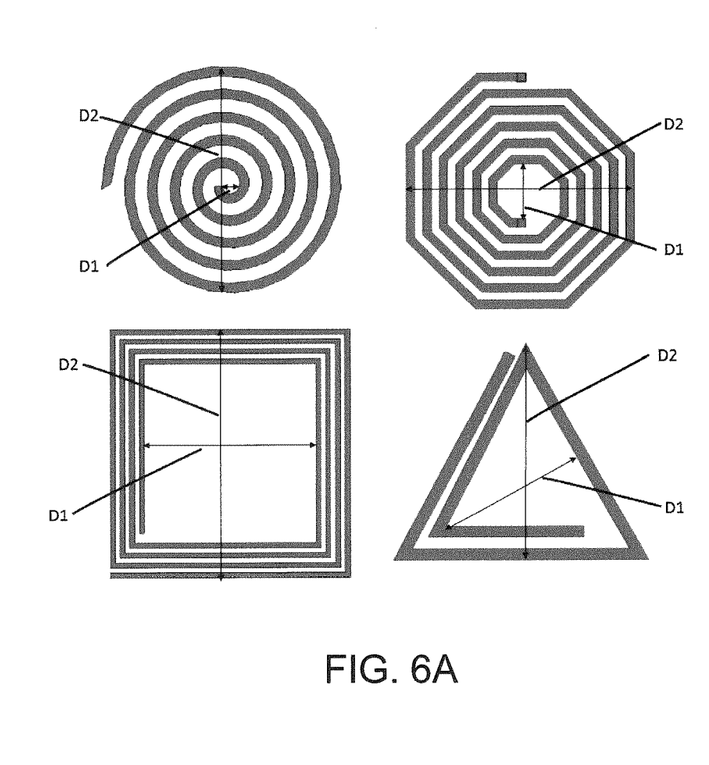
FIG. 6A illustrates examples of different shapes of the small loop transmission coils of the charging system of FIGS. 2A-2C according to embodiments.
Figure 6B:
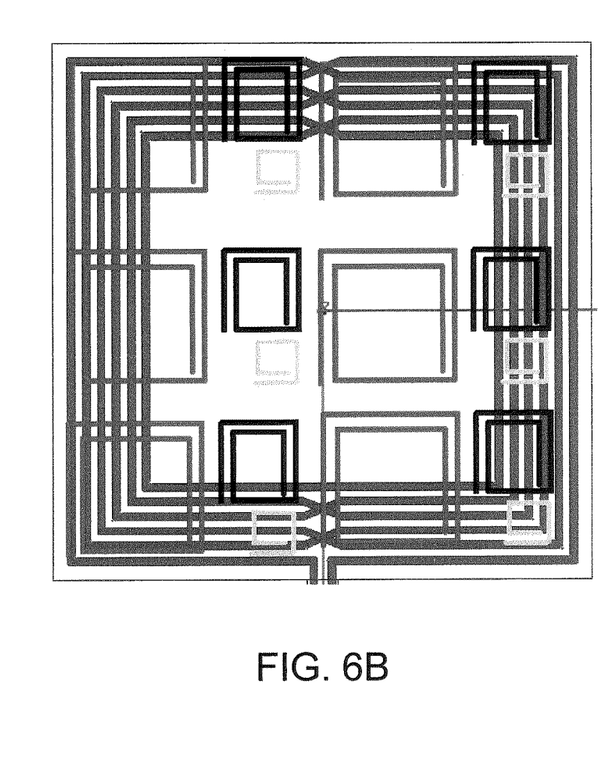
FIG. 6B illustrates the small loop transmission coils with different shapes and sizes of FIG. 6a being tiled one by one under the primary coil antenna of the charging system shown in FIGS. 2A-2C according to an embodiment.

As shown in FIG. 6A, the small loop transmission coils 22 can be in different shapes, such as a rectangle, a circle, a polygon, a square, a triangle or any combination of shapes. Of course, other shapes are possible and workable. D1 and D2 are the inner and outer diameters, respectively, of the differently shaped small loop transmission coils 22. As shown in FIG. 6B, according to an embodiment, the ones of the pairs of small loop transmission coils 22 with different shapes and/or sizes can be tiled one by one (side by side, and see FIG. 8) under the primary coil antenna 21 of the wireless charging device 20 in order to achieve an optimal coupling effect for the wireless charging application.

Figure 7A:
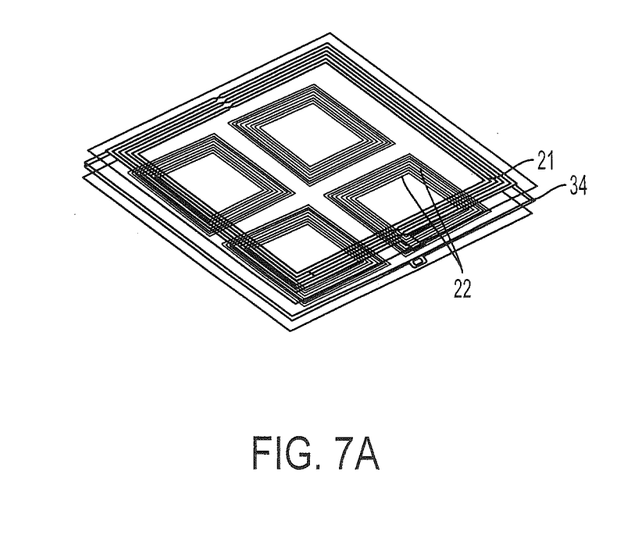
FIGS. 7A and 7B show the structure and fabrication method for producing the primary coil antenna with the small loop transmission coils of the charging system shown in FIGS. 2A-2C according to an embodiment.
Figure 7B:
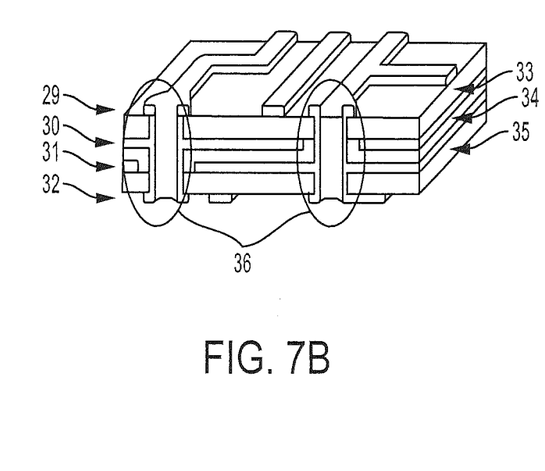

The size and/or shape of each loop transmission coil in one pair of small loop transmission coils 22 can be different, and the shapes and structures of the pairs of the different small loop transmission coils 22 are the same. As shown in FIG. 5A, one small loop transmission coil 22 of the pair has a smaller dimension (size) than the other one of the pair. However, it is possible that the one small loop transmission coil 22 has a different shape than the other one of the pair, as shown in FIG. 6A. FIGS. 7A and 7B show the structure and fabrication method for producing the primary coil antenna 21 with the pairs of small loop transmission coils 22 of the charging device 20 shown in FIGS. 2A-2C according to an embodiment. The whole antenna unit made up of the primary coil antenna 21 and the pairs of small loop transmission coils 22 can be fabricated by using a printed circuit board (PCB) with four (4) layers. The four layer PCB has four (4) metal layers 29-32 and three (3) dielectric layers 33-35. The layer stackup is shown in FIG. 7B. The primary coil antenna 21 is printed on the first and second metal layers 29, 30. The small loop transmission coils 22 are printed on the third and fourth metal layers 31 and 32. Vias 36 between the metal layers 29-32 provide electrical connection for the primary antenna coil 21 and the pairs of small loop transmission coils 22. The dielectric layers 33-35 between the metal layers 29-32 are dielectric material, such as FR4 and BT, for example. The dielectric layer 34 is a PCB core in the middle of the PCB structure.

Figure 8:
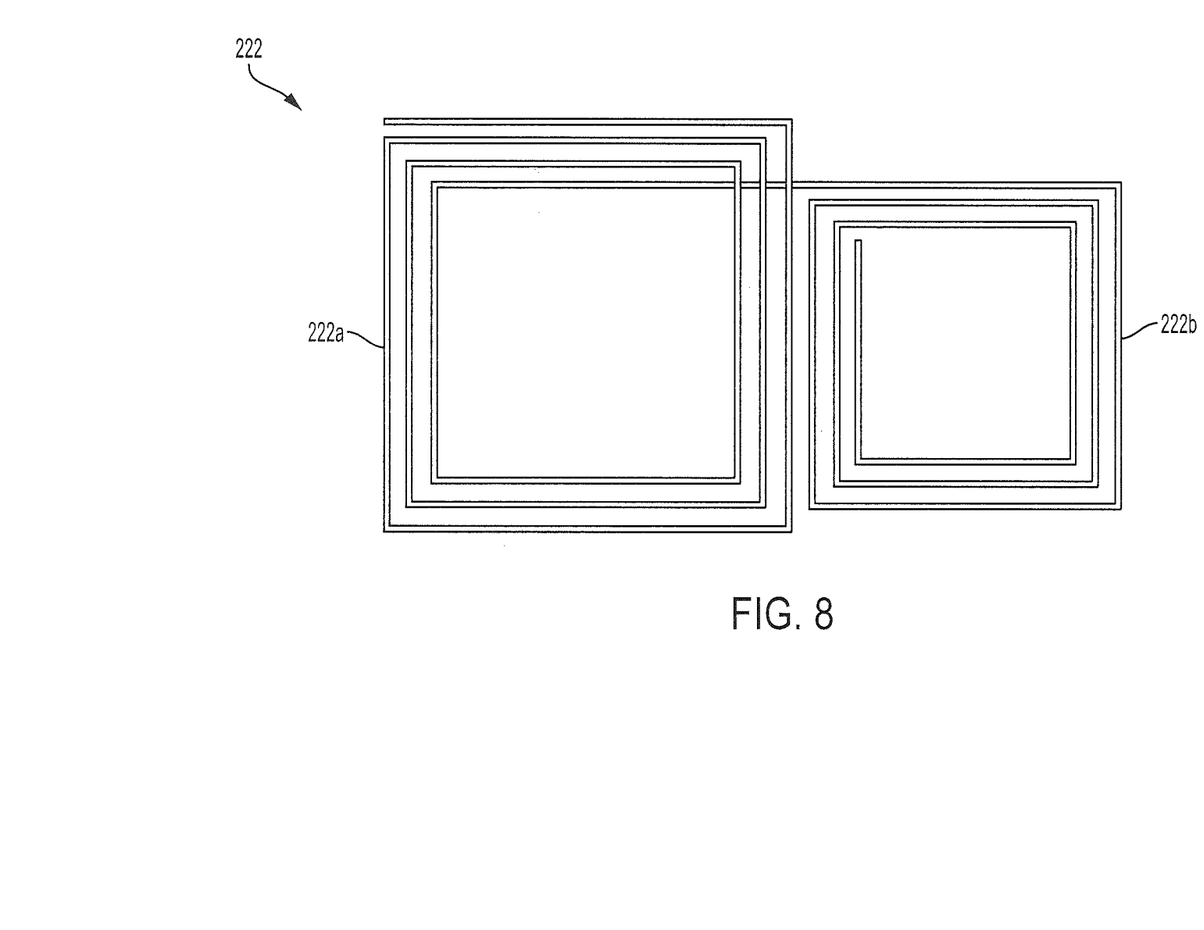
FIG. 8 illustrates a blown up view of a pair of small loop transmission coils wherein a bigger one of the pair is placed side by side with the smaller one, according to another embodiment.

FIG. 8 shows a pair of small loop transmission coils 222, wherein a bigger one 222a of the small loop transmission coils 222 is not placed around a smaller one of the small loop transmission coils 222b as is shown in FIGS. 2A, 2B and 2C, but is instead placed side by side with the smaller one 222b according to another embodiment.

As set forth above, according to the embodiments of the present invention, the proposed design of a wireless charging device having multiple small loop transmission coils with different sizes under the coil antenna provides a magnetic field with better uniformity in order to achieve optimal coupling effect, thereby more effectively performing the wireless charging.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A charging device to wirelessly charge a target device, comprising:
    a coil antenna having a first surface facing a first direction at which the target device is placed for charging and a second surface facing an opposite direction from the first direction, generating a first magnetic field;
    a plurality of pairs of metallic small loop transmission coils arranged to the second surface side of the coil antenna, to generate a second magnetic field in response to the first magnetic field to enhance the first magnetic field, the first and second magnetic fields being directed in the first direction; and
    wherein a first one of each pair of metallic small loop transmission coils is coupled to a second one of the pair in parallel and a size of the first one of each pair is different from that of the second one of the pair, such that when a distance between the target device and the first surface is changed, one of the pair of metallic small loop transmission coils is enabled to be resonant with the coil antenna, and
    wherein inductance and capacitance values, for each metallic small loop transmission coil, with a number of turns N, turn width W, spacing between turn S, inner diameter D1, outer diameter D2, inductance L, capacitance C, and frequency f, the inductance $L_{loop}$ and capacitance $C_{total}$ are determined by formula (1) below:

$$f = \frac{1}{2\pi\sqrt{L_{loop}C_{total}}}. \quad (1)$$

2. The charging device of claim 1, wherein the size of each of the metallic small loop transmission coils is predesigned to enable the corresponding small loop transmission coil to be resonant with the coil antenna in response to a distance between the target device and the coil antenna being a corresponding predefined target distance.

3. The charging device of claim 1, wherein each of the first and second metallic small loop transmission coils of the pairs of metallic small loop transmission coils is one of a rectangle, circle, polygon, square, triangle or any combination thereof, and each first metallic transmission loop coil has a different shape from the corresponding second metallic transmission loop coil.

4. The charging device of claim 1, further comprising capacitors respectively connected to each small loop transmission coil in series.

5. The charging device according to claim 4, wherein the capacitors are gaps.

6. The charging device according to claim 4, wherein the capacitors are ceramic capacitors.

7. The charging device of claim 1, wherein the first one of each pair of metallic small loop transmission coils is located within the second one of the pair.

8. The charging device according to claim 1, wherein the first one of each pair of metallic small loop transmission coils is smaller than the second one of the pair, and located to a side of the second one of the pair.

9. The charging device according to claim 1, wherein the first ones of each pair of small loop transmission coils have the same size and shape, and the second ones of each pair of small loop transmission coils have the same size and shape, and the ones of the same small loop pair have a different size and different shape.

10. The charging device of claim 1, wherein the metallic small loop transmission coils are designed in accordance with:
    determining a first set of D1, D2, W and S for the first one of each pair of metallic small loop transmission coils based upon a size of the coil antenna and a quantity of the pairs of metallic small loop transmission coils and calculating a first loop inductance;
    calculating a first series capacitor value for the first capacitor of the first metallic small loop transmission coil according to formula (1);
    building a simulation model to fine tune the first capacitor;
    determining a second set of D1, D2, W and S for the second one of each pair of metallic small loop transmission coils based upon a size of the first one of the pair of metallic small loop transmission coils and calculating a second loop inductance;
    calculating a second series capacitor value for the second capacitor of the second metallic small loop transmission coil according to formula (1);
    building a simulation model to fine tune the second capacitor based upon predetermined distances set for between the coil antenna and the target device; and
    combining the first and second metallic small loop transmission coils in parallel, and fine tune the first and second capacitors.

11. The charging device according to claim 1, wherein each pair of metallic small loop transmission coils comprises at least 2 metallic small loop transmission coils connected in parallel to each other.

12. The charging device according to claim 1, wherein each pair of metallic small loop transmission coils comprises at least 3 metallic small loop transmission coils connected in parallel to each other.

13. A method of wirelessly charging a target device, comprising:
    generating a first magnetic field from a second surface of a coil antenna, the coil antenna having a first surface facing a first direction at which the target device is placed for charging and the second surface facing an opposite direction from the first direction; and
    generating a second magnetic field using a plurality of pairs of metallic small loop transmission coils arranged to the second surface side of the coil antenna in response to the first magnetic field, the first and second magnetic fields being directed in the first direction;
    wherein a first one of each pair of metallic small loop transmission coils is coupled to a second one of the pair in parallel and a size of the first one of each pair is different from that of the second one of the pair, such that when a distance between the target device and the first surface is changed, one of the pair of metallic small loop transmission coils is enabled to be resonant with the coil antenna wherein capacitors are respectively connected to each small loop transmission coil in series, and wherein inductance and capacitance values, for each metallic small loop transmission coil, with a number of turns N, turn width W, spacing between turn S, inner diameter D1, outer diameter D2, inductance L, capacitance C, and frequency f, the inductance $L_{loop}$ and capacitance $C_{total}$ are determined by formula (1) below:

$$f = \frac{1}{2\pi\sqrt{L_{loop}C_{total}}}. \qquad (1)$$

14. The method of claim 13, wherein the size and/or shape of each of the metallic small loop transmission coils are predesigned to enable the corresponding small loop transmission coil to be resonant with the coil antenna in response to a distance between the target device and the coil antenna being a corresponding predefined target distance.

15. The method of claim 13, wherein each of the first and second metallic small loop transmission coils of the pairs of metallic small loop transmission coils is one of a rectangle, circle, polygon, square, triangle or any combination thereof, and each first metallic transmission loop coil has a different shape from the corresponding second metallic transmission loop coil.

16. The method of claim 13, wherein the metallic small loop transmission coils are designed in accordance with:
   determining a first set of D1, D2, W and S for the first one of each pair of metallic small loop transmission coils based upon a size of the coil antenna and a quantity of the pairs of metallic small loop transmission coils and calculating a first loop inductance;
   calculating a first series capacitor value for the first capacitor of the first metallic small loop transmission coil according to formula (1);
   building a simulation model to fine tune the first capacitor;
   determining a second set of D1, D2, W and S for the second one of each pair of metallic small loop transmission coils based upon a size of the first one of the pair of metallic small loop transmission coils and calculating a second loop inductance;
   calculating a second series capacitor value for the second capacitor of the second metallic small loop transmission coil according to formula (1);
   building a simulation model to fine tune the second capacitor based upon predetermined distances set for between the coil antenna and the target device; and
   combining the first and second metallic small loop transmission coils in parallel, and fine tune the first and second capacitors.

17. The method according to claim 13, wherein the first ones of each pair of small loop transmission coils have the same size and shape, and the second ones of each pair of small loop transmission coils have the same size and shape, and the ones of the same small loop pair have a different size and different shape.

18. A method of designing a charging device to wirelessly charge a target device, comprising:
   a coil antenna having a first surface facing a first direction at which the target device is placed for charging and a second surface facing an opposite direction from the first direction, generating a first magnetic field;
   a plurality of pairs of metallic small loop transmission coils arranged to the second surface side of the coil antenna, to generate a second magnetic field in response to the first magnetic field to enhance the first magnetic field, the first and second magnetic fields being directed in the first direction; and
wherein a first one of each pair of metallic small loop transmission coils is coupled to a second one of the pair in parallel and a size of the first one of each pair is different from that of the second one of the pair, such that when a distance between the target device and the first surface is changed, one of the pair of metallic small loop transmission coils is enabled to be resonant with the coil antenna, the method comprising:
   determining inductance and capacitance values, for each metallic small loop transmission coil, with a number of turns N, turn width W, spacing between turn S, inner diameter D1, outer diameter D2, inductance L, capacitance C, and frequency tf, the inductance $L_{loop}$ and capacitance $C_{total}$ by formulae (1) and (2) below:

$$f = \frac{1}{2\pi\sqrt{L_{loop}C_{total}}} \qquad (1)$$

$$L = (N^2 \times A^2)/(30A - 11D1) \qquad (2)$$
$$A = (D1 + N(W + S))/2$$

according to the following:
   determining a first set of D1, D2, W and S for the first one of each pair of metallic small loop transmission coils based upon a size of the coil antenna and a quantity of the pairs of metallic small loop transmission coils and calculate a first loop inductance based upon formula (2);
   calculating a first series capacitor value for the first capacitor of the first metallic small loop transmission coil according to formula (1);
   building a simulation model to fine tune the first capacitor;
   determining a second set of D1, D2, W and S for the second one of each pair of metallic small loop transmission coils based upon a size of the first one of the pair of metallic small loop transmission coils and calculate a second loop inductance based upon formula (2);
   calculating a second series capacitor value for the second capacitor of the second metallic small loop transmission coil according to formula (1);
   building a simulation model to fine tune the second capacitor based upon predetermined distances set for between the coil antenna and the target device; and
   combining the first and second metallic small loop transmission coils in parallel, and fine tune the first and second capacitors.

* * * * *